(12) United States Patent
Cho

(10) Patent No.: US 8,886,454 B2
(45) Date of Patent: Nov. 11, 2014

(54) ROAD GUIDANCE DISPLAY METHOD AND SYSTEM USING GEOTAGGING IMAGE

(75) Inventor: Sung Tae Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 72 days.

(21) Appl. No.: 13/468,636

(22) Filed: May 10, 2012

(65) Prior Publication Data

US 2013/0151144 A1 Jun. 13, 2013

(30) Foreign Application Priority Data

Dec. 7, 2011 (KR) .......................... 10-2011-0130033

(51) Int. Cl.
*G06F 17/00* (2006.01)

(52) U.S. Cl.
USPC ............... 701/428; 701/2; 701/200; 701/201; 701/208; 701/209; 701/211; 701/514; 701/533; 362/492; 359/838; 340/425.5; 345/633

(58) Field of Classification Search
USPC ............. 701/2, 200, 201, 208, 209, 211, 514, 701/533; 362/492; 359/838; 340/425.5; 345/633
See application file for complete search history.

(56) References Cited

U.S. PATENT DOCUMENTS

| | | | | |
|---|---|---|---|---|
| 6,714,862 B1 * | 3/2004 | Lau et al. | ....................... | 701/533 |
| 8,306,747 B1 * | 11/2012 | Gagarin et al. | ................ | 701/514 |
| 2002/0159270 A1 * | 10/2002 | Lynam et al. | .................. | 362/492 |
| 2003/0117728 A1 * | 6/2003 | Hutzel et al. | ................... | 359/838 |
| 2004/0145457 A1 * | 7/2004 | Schofield et al. | .......... | 340/425.5 |
| 2005/0027444 A1 | 2/2005 | Kim | | |
| 2006/0031008 A1 * | 2/2006 | Kimura et al. | ................ | 701/208 |
| 2007/0010938 A1 * | 1/2007 | Kubota et al. | .................. | 701/200 |
| 2008/0114543 A1 * | 5/2008 | Vishnu | .......................... | 701/209 |
| 2008/0243374 A1 * | 10/2008 | Hatazawa | ...................... | 701/208 |
| 2010/0004849 A1 * | 1/2010 | Jeong | ............................ | 701/200 |
| 2010/0082230 A1 * | 4/2010 | Hong et al. | ..................... | 701/201 |
| 2010/0082232 A1 * | 4/2010 | Lee | ................................ | 701/201 |
| 2010/0100318 A1 * | 4/2010 | Jung et al. | ...................... | 701/211 |
| 2010/0106345 A1 * | 4/2010 | Hwang et al. | ..................... | 701/2 |
| 2010/0125407 A1 * | 5/2010 | Cho et al. | ....................... | 701/201 |
| 2010/0153000 A1 | 6/2010 | Akita et al. | | |
| 2010/0268451 A1 * | 10/2010 | Choi | ............................. | 701/201 |
| 2010/0305844 A1 * | 12/2010 | Choi et al. | ..................... | 701/201 |
| 2012/0038670 A1 * | 2/2012 | Choi et al. | ..................... | 345/633 |
| 2012/0098859 A1 * | 4/2012 | Lee et al. | ....................... | 345/633 |

FOREIGN PATENT DOCUMENTS

| | | |
|---|---|---|
| JP | 2009186372 A | 8/2009 |
| KR | 1020000013568 A | 3/2000 |
| KR | 1020090070048 A | 7/2009 |
| KR | 10-2010-0035842 | 4/2010 |
| KR | 1020110093433 A | 8/2011 |

* cited by examiner

*Primary Examiner* — James Trammell
*Assistant Examiner* — Sanjeev Malhotra
(74) *Attorney, Agent, or Firm* — Edwards Wildman Palmer LLP; Peter F. Corless

(57) ABSTRACT

A road guidance display method and system using a geotagging image are provided. More specifically, a street image is stored by capturing the street image at a specific point by a camera and storing the street image along with position information at a corresponding point. Subsequently, the street image stored in the storing process is output on a screen when a reproduction command is input by a user or when a vehicle is within a predetermined distance from a street image capturing point.

11 Claims, 9 Drawing Sheets

ROAD GUIDANCE DISPLAY METHOD AND SYSTEM USING GEOTAGGING IMAGE

CROSS-REFERENCES TO RELATED APPLICATIONS

This application claims priority to Korean patent application No. 10-2011-0130033 filed on Dec. 7, 2011, the disclosure of which is hereby incorporated in its entirety by reference.

BACKGROUND OF THE INVENTION

1. Field of the Invention

The present invention relates to road guidance technology, and more particularly, to a road guidance display method and system using a geo-tagging image capable of providing a vivid road guidance function based on actual road conditions by capturing street images in association with geographic information at specific points in advance and performing road guidance based on a captured street image at a point of time when a user requires the captured street image or when a vehicle passes through a corresponding point.

2. Description of the Related Art

As new roads often arise or old roads disappear, the roads in the city change just like living things. In addition, when large buildings are built or large-scale development construction is progressed, it becomes more difficult to find certain roads.

Thus, navigation systems which guide users to a destination via a route are very useful to drivers, especially in larger often complex urban environments. Thus, over the past decade, navigation systems have grown rapidly in terms of popularity.

When driving in urban environment or on a new road, a driver can still become lost very quickly when the road conditions or obstacles, or changes in the road cause a change in the projected/expected route. This may be caused because a map and map information in a memory embedded in the navigation system have not been duly updated. However, no matter how accurate and diverse information by to the navigation system is, navigation systems still cannot account for all of the roads, environmental changes and map information which a driver may encounter. This is, it is difficult for conventional navigation systems to provide vivid geographic information and road information such as positions, arrangements, and colors of surrounding buildings, conspicuous signs or store names, etc., to allow the driver to visual the actual surrounding on the route, due to physical capacity of the navigation system.

SUMMARY OF THE INVENTION

Various aspects of the present invention have been made in view of the above problems discussed above, and provide a road guidance display method and system using a geo-tagging image capable of providing a vivid road guidance function based on actual road conditions by capturing street images in association with geographic information at specific points in advance and performing road guidance based on a captured street image at a point of time when a user requires the captured street image or when a vehicle passes through a corresponding point.

According to an aspect of the present invention, a road guidance display apparatus using a geo-tagging image in a traveling guidance system for a vehicle is provided. The apparatus may include: a user input unit configured to input a control command by a user; a position information receiving unit configured to receive position information wirelessly transmitted; a camera configured to capture a street image at a specific point and provide image information corresponding to the captured street image according to a predetermined control signal; a street information storage unit configured to store the image information for the street image captured by the camera with position information at a street image capturing point of time when a street image capture command is input through the user input unit; a guidance message output unit configured to execute road guidance to the user through an image or voice message according to a predetermined control signal; and a control unit configured to read the street image stored in the street information storage unit and control the read street image to be output through the guidance message output unit when a street image reproduction command is input through the user input unit or when it is confirmed that a current position of a vehicle is within a predetermined distance from a street image capturing point from an analysis result based on the position information received by the position information receiving unit.

The guidance message output unit may include a display device configured to output image guidance information and a voice output device configured to output voice guidance information.

The street information storage unit may include an image information storage module configured to store image information for the captured street image and a position information storage module configured to store the position information of the vehicle at the street image capturing point of time.

The camera and the position information receiving unit may be configured to use a configuration of a smart phone of the user connected to the control unit through a connector. The camera and the position information receiving unit may be further configured of a combination of a "black box" disposed in the vehicle and a navigation system.

The apparatus may further include a map information storage unit configured to store geographic information and road information around a road on which the vehicle is traveling as data. The control unit may control the geographic information and road information around the road provided from the map information storage unit to be output through the guidance message output unit based on the street information stored in the street information storage unit. The user input unit may include a touch screen integrally embedded with the display device as a touch panel.

According to another aspect of the present invention, a road guidance display method using a geo-tagging image in a traveling guidance system for a vehicle is provided. The method may include performing a process of storing a street image by capturing a street image at a specific point by a camera and storing, by a storage unit, the street image with position information at a corresponding point. Then subsequently, performing a process for street guidance by outputting the street image stored in the storing process on a screen when a reproduction command is input by a user or when a vehicle is within a predetermined distance of a street image capturing point.

Performing street guidance may include: performing a process of analyzing a moving path in which the vehicle is to be traveling; performing a process of determining whether or not the vehicle passes through the street image capturing point based on the analysis result in the analyzing process; performing a process of setting a guidance point by calculating and setting a street image output point according to the analysis result in the analyzing process and the determination result in the determining process; performing a process of confirming whether or not the vehicle enters the street image output point calculated in the in the guidance point setting process; and performing a process of outputting the street image on the screen when it is confirmed that the vehicle enters the street image output point in the confirming process.

Performing the street image storing process may include capturing the street image by rotating the camera in 360 degrees on the basis of a traveling direction of the vehicle and storing a forward street image. Thus, the method may be implemented to provide the street image for the traveling direction of the vehicle even when the vehicle passes through the street image capturing point in any direction based on the analysis result in the analyzing process.

Performing the guidance point setting process may include setting a plurality of guidance points in a predetermined distance interval on the basis of the street image capturing point. Performing the street image outputting process may include classifying a position of the vehicle for each area on the basis of each guidance point calculated in the guidance point setting process and displaying the street image by changing a size and color of the street image according to a position at which the vehicle arrives.

According to the exemplary embodiment of the present invention having the above-described configuration, a driver has previously captured a street image at the driver's desire specific point using a camera embedded with position information. Furthermore, route guidance is executed based on the street image when image information at a corresponding point is necessary due to user request or when a vehicle passes through the corresponding point, so that the user can receive (i.e., view) a vivid road guidance service based on actual road conditions.

The apparatuses and methods of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Figure 1:
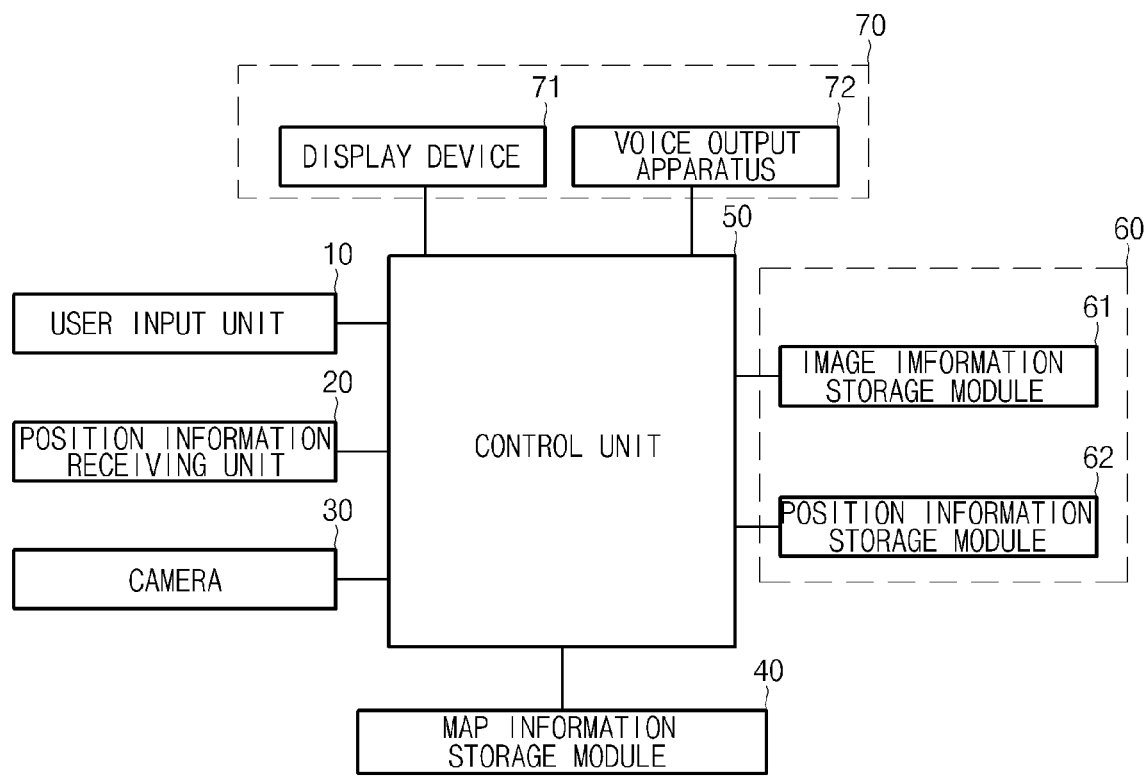
FIG. 1 is a block diagram illustrating a main configuration of a road guidance display apparatus using a geo-tagging image according to an exemplary embodiment of the present invention.

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

FIG. 1 is a block diagram illustrating an exemplary configuration of a road guidance display apparatus using a geo-tagging image according to an exemplary embodiment of the present invention. In FIG. 1, a user input unit 10 is configured to input a user's control command and a position information receiving unit 20 is configured to receive position information such as global positioning system (GPS) data from a satellite.

The user input unit 10 may be implemented as an input unit such as a key pad or a touch panel. When the user input unit 10 is implemented as a touch panel, the user input unit 10 may be integrally configured with a display device 71 which will be described later.

A camera 30 is configured to capture a street image at a specific point according to a predetermined control signal and provide corresponding image information. A map information storing unit 40 is configured to store geographic information and road information around a road on which a vehicle is traveling.

A control unit 50 is configured to control an overall operation of the apparatus and a street information storage unit 60 is configured to store image information for the street image captured by the camera together with position information at a street image capturing point of time according to a predetermined control signal from the control unit 50. The street information storage unit 60 includes an image information storage module 61 configured to store image information for the captured street image and a position information storage module 62 configured to store position information of a vehicle at the street image capturing point of time.

Meanwhile, in the above-described exemplary embodiment, the camera 30 and the position information receiving unit 20 may be configured to be separately mounted in the vehicle to perform the above-described processes. However, the processes of the camera 30 and the position information receiving unit 20 may be implemented using a configuration of a user's smart phone by causing the smart phone to be connected to the control unit 50 through a connector attached to the smart phone. Alternatively, the camera 30 and the position information receiving unit 20 may be configured of a combination of a "black box" for a vehicle, a navigation system, and the like. A "black box" is a device, system or object which is configured to be viewed in terms of its input, output and transfer characteristics without any knowledge of its internal workings, that is, its implementation is "opaque" (black). Thus, known systems and methods may be used to implement its structure.

Figure 2:
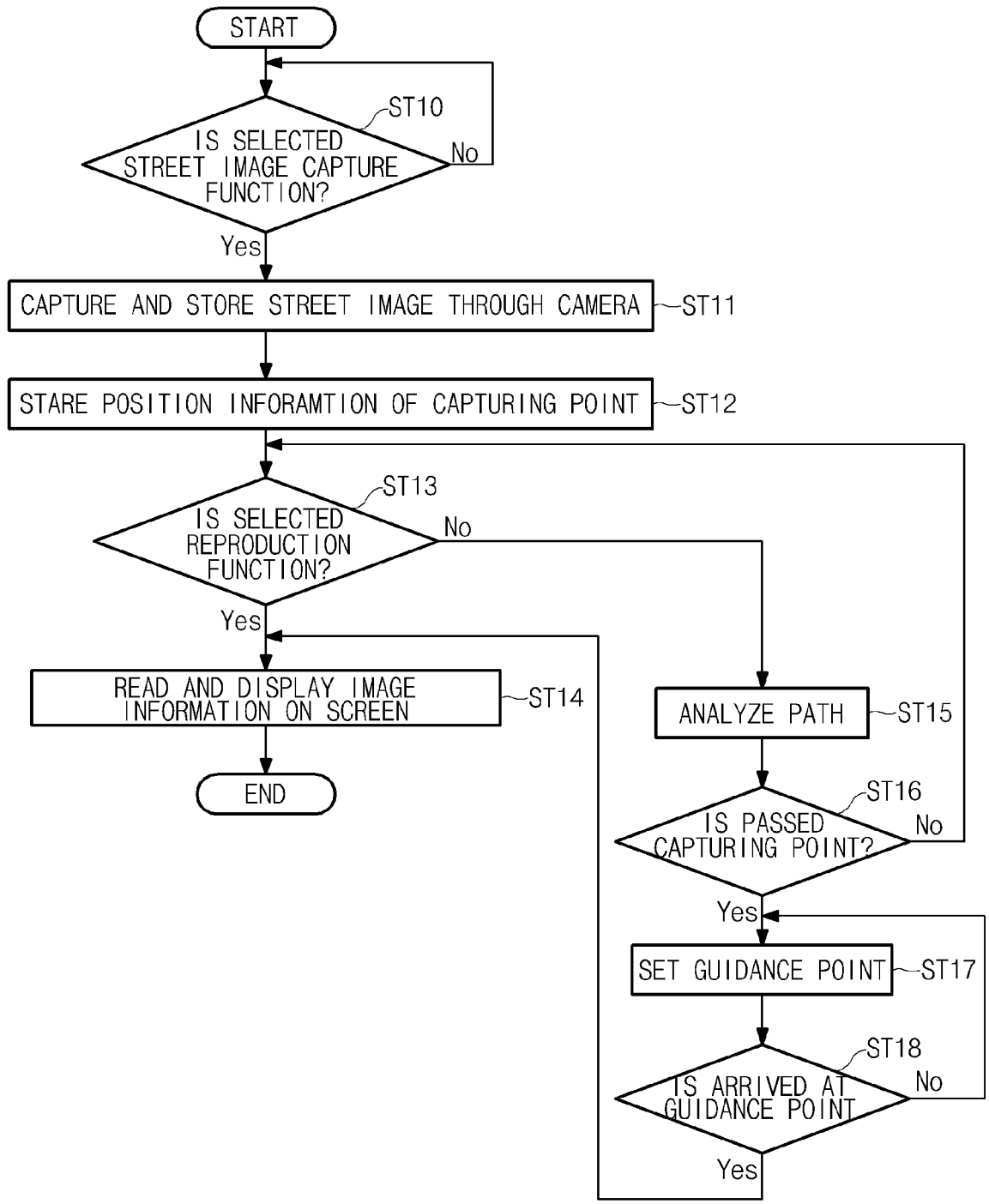
FIG. 2 is a flowchart illustrating an operation of the road guidance display apparatus having the configuration of FIG. 1.

A guidance message output unit 70 is configured to include a display device 71 and a voice output device 72 and execute road guidance to a driver through an agreed image or voice message according to control of the control unit 50. Subsequently, an operation of the road guidance display apparatus will be described with reference to a flowchart of FIG. 2.

When a vehicle initially begins to move, the control unit 50 reads road information at the point at which the vehicle is positioned from the map information storage unit 40 based on current position information of the vehicle provided from the position information receiving unit 20 and outputs a predetermined guidance message through the display device 71 and the voice output device 72, thereby executing traveling guidance service.

Figure 3:
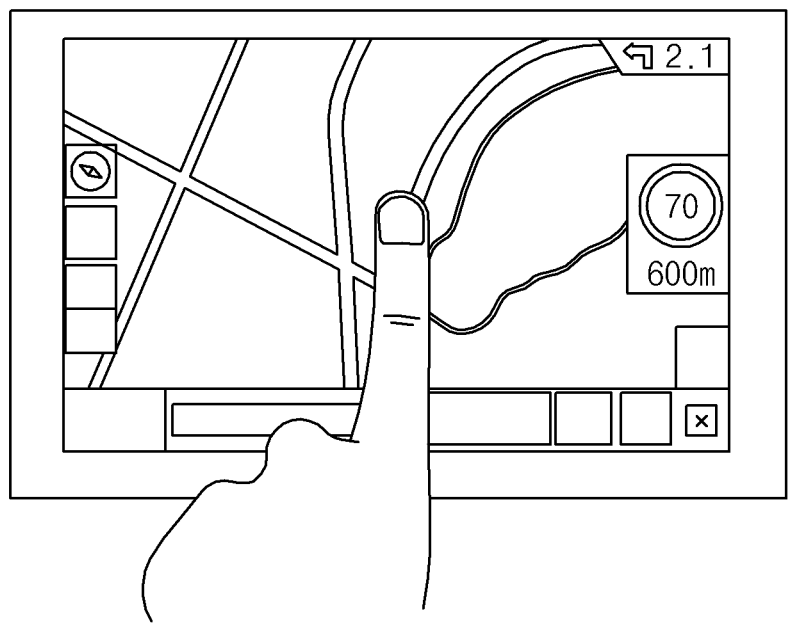
FIG. 3 is a view illustrating a process of selecting a street image capture function by a user according to an exemplary embodiment of the present invention.
Figure 4:
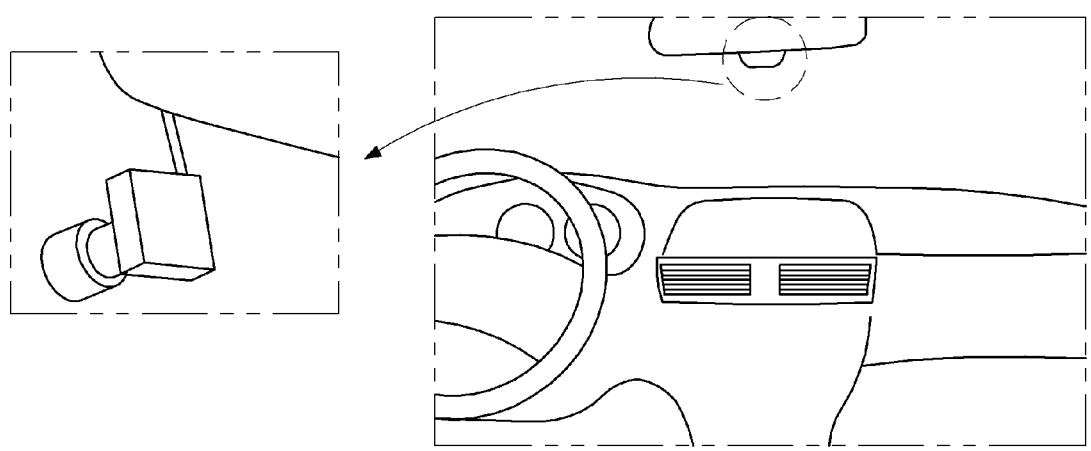
FIG. 4 is a view illustrating an example of installation and operation of a camera according to an exemplary embodiment of the present invention.
Figure 5:
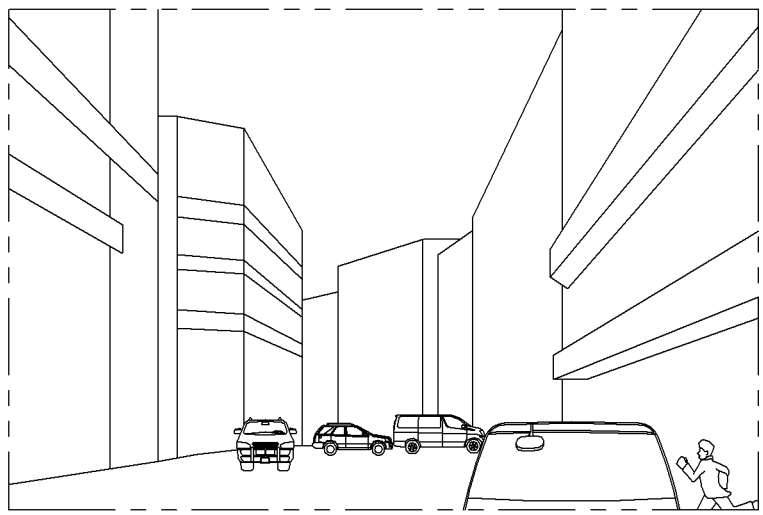
FIG. 5 is a view illustrating a captured street image according to an exemplary embodiment of the present invention.

While the vehicle is traveling, when a user selects a street image capture function, for example, by touching a certain point on a touch panel via his/her finger as shown in FIG. 3 or by pushing a specific button (not shown) included in the user input unit 10, the control unit 50 recognizes the selection for the street image capture function (ST10) and drives the camera as shown in FIG. 4. As a result, as shown in FIG. 5, a street image viewed in a traveling direction of the vehicle at the current position of the vehicle is captured and image information for the captured street image is stored in the image information storage module 61 (ST11).

The control unit 50 stores position information of the street image capturing point applied from the position information receiving unit 20 in the position information storage module 62 at the street image capturing point of time (ST12). At this time, the image information for the street image stored in the image information storage module 61 and the position information stored in the position information storage module 62 are stored as associated information.

The image information for the street image and the position information in association with each other are stored by using, e.g., a so-called geo-tagging method in which geographic information, for example, such as GPS information, is interpolated into the image information for the street image.

When the above-described process of storing the image information for the street image and the position information has been completed, if the user selects a reproduction function for a corresponding street image through the user input unit 10, the control unit 50 senses the selection for the reproduction function (ST13). When it is determined that the reproduction function is selected in step ST13, the control unit 50 reads the street image stored in the image information storage module 61 and outputs a corresponding street image through the display device 71, thereby displaying the captured street image on a screen to cause the user to confirm the street image (ST14).

Meanwhile, when it is determined that the reproduction function is not selected by the user in the step ST13, the control unit 50 analyzes the moving path (i.e., path of travel) of the vehicle based on a traveling direction, speed, destination, and current position information of the vehicle (ST15) and determines whether or not the vehicle is expected to pass through the street image capturing point according to the analysis result (ST16). When it is determined that the vehicle is not expected to pass through the street image capturing point in step ST17, the control unit 50 returns to step ST13. Meanwhile, when it is determined that the vehicle is expected to pass through the street image capturing point in step ST17, the control unit 50 calculates a point at which the traveling guidance is to be output through the captured street image and sets the traveling guidance output point (ST17).

Figure 6:
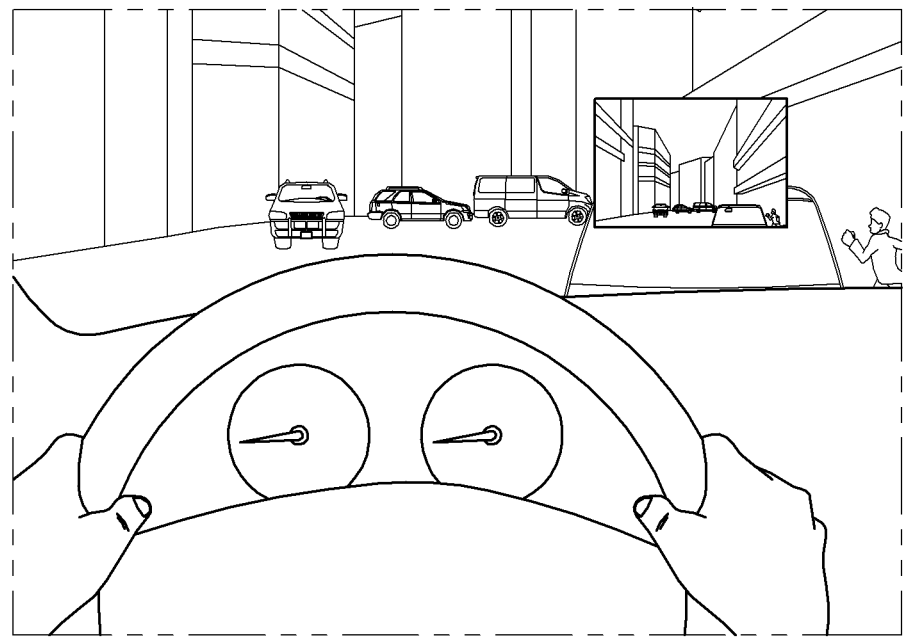
FIG. 6 is a view illustrating a street image reproduction screen according to an exemplary embodiment of the present invention.

When preparation for the traveling guidance through the street image has been completed by the above-described process, if the vehicle is continuously traveling along a predicted path and reaches the traveling guidance output point set in step ST17, the control unit 50 determines whether or not the vehicle has reached the traveling guidance output point based on the position information applied from the position information receiving unit 20 (ST18). When it is determined that the vehicle reaches the traveling guidance output point in step ST18, the control unit 50 returns to step ST14. Then, the control unit 50 reads the captured street image from the image information storage module 61 and outputs the captured street image through the display device 71 as shown in FIG. 6. Thus, the control unit 50 provides a reference screen to the user so that the user can more accurately recognize certain geographic features or elements at a current position through an actual street image and receive the clear traveling guidance.

That is, according to the exemplary embodiment, a system which captures and stores the street image in advance at a specific point in association with geographic information using a camera having a geo-tagging capturing function and executes traveling guidance based on the captured street image when a vehicle passes through a corresponding point, thereby providing a vivid road guidance function based on real road conditions, can be implemented.

The present invention is not limited to the exemplary embodiment. The exemplary embodiment may be modified without departing from the spirit and scope of the present invention. For example, the apparatus may be implemented to enable the camera 30 to capture the street image in a traveling direction of a vehicle as well as with in 360 degrees in a process of capturing and storing the street image through the camera in step ST11. In addition, the apparatus may be implemented to cause the control unit 50 to store the forward street image in the image information storage module 61 and provide a guidance screen for the traveling direction of the vehicle even when the vehicle passes through the corresponding point in any direction as the path analysis result in step ST15.

When the guidance screen is provided, in addition to displaying the street image at a corresponding point which has been captured and stored, the apparatus may be implemented to output a specific traveling guidance screen in which guidance information such as a lane to be entered or direction change based on the street image is displayed.

Figure 7A:
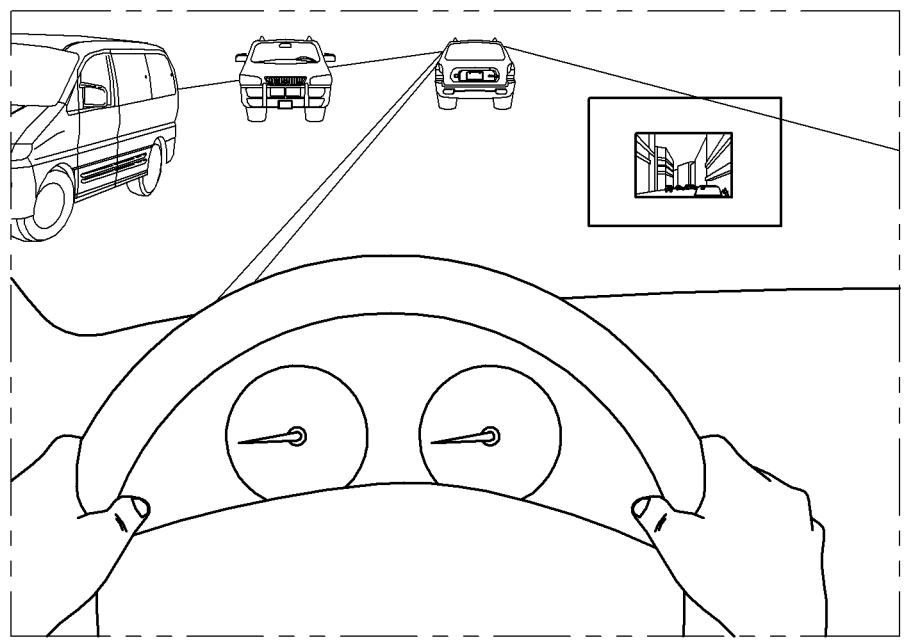
FIGS. 7A to 7C are views illustrating a method of outputting a captured street image on a screen according to an exemplary embodiment of the present invention.
Figure 7B:
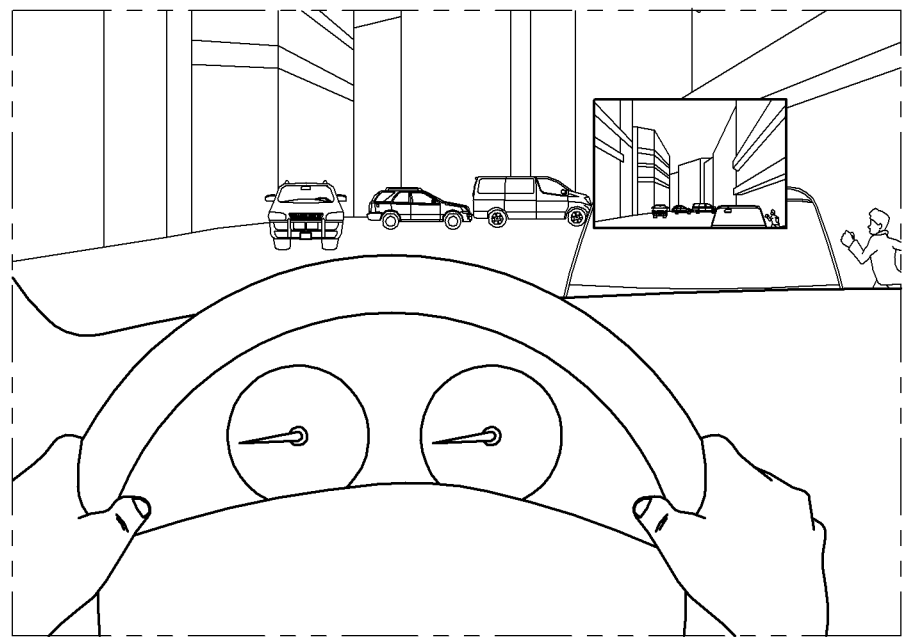
Figure 7C:
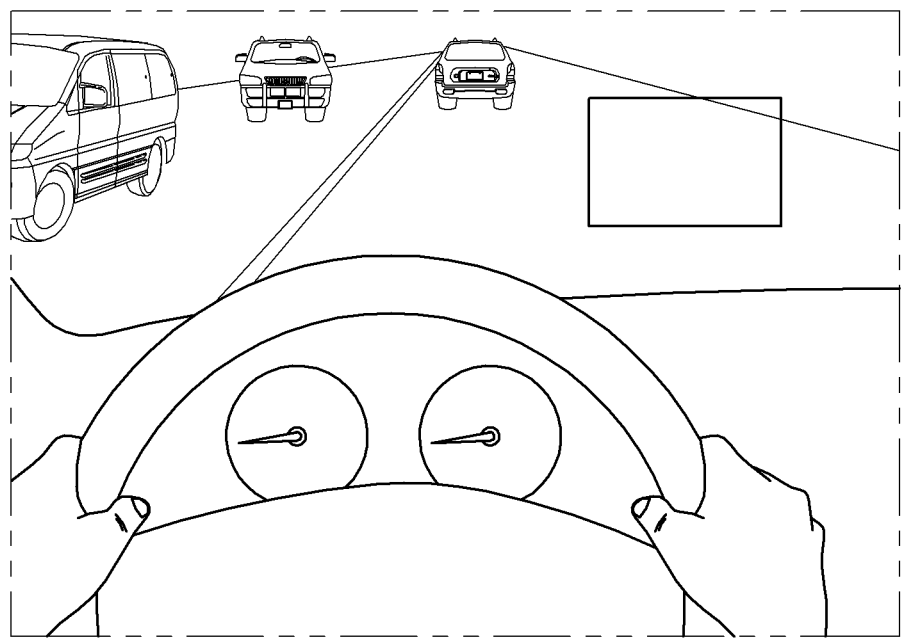

FIGS. 7A to 7C illustrate an example of a method of effectively outputting a captured street image on a screen. When a vehicle enters within a predetermined distance from a point on the captured image, as shown in FIG. 7A, the captured street image may be displayed, for example, in a portion of the screen that is smaller than the overall surface area of the screen. The captured street image may be displayed within a yellow box area on a display device included in a head unit.

Subsequently, as the vehicle gets closer to a corresponding point, as shown in FIG. 7B, the street image is output to be gradually become larger or zoomed in within a green box area. Finally, when the vehicle passes through the corresponding point, as shown in FIG. 7C, the street image is again zoomed out until only a red box area flickers several times and then disappeared. Therefore, the user intuitively recognizes whether or not the vehicle has already passed through the corresponding point.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A road guidance display apparatus using a geo-tagging image in a traveling guidance system for a vehicle, the apparatus comprising:
    an input unit configured to input a control command by a user;
    a receiving unit configured to receive position information wirelessly transmitted;
    a camera configured to capture a real street image having real street conditions at a specific point and provide image information corresponding to the real street image according to a control signal;
    a storage unit configured to store the image information for the real street image captured by the camera with position information at a street image capturing point of time when a street image capture command is input through the input unit;
    an output unit configured to execute road guidance to the user through an image or voice message according to a predetermined control signal; and
    a control unit configured to read the real street image stored in the storage unit, control the read real street image to be displayed on a screen when a street image reproduction command is input through the input unit or when it is confirmed that a current position of a vehicle is within a predetermined distance from a street image capturing point from an analysis result based on the position information received by the receiving unit,
    wherein the control unit is further configured to analyze a moving path in which the vehicle is to be traveling, determine whether or not the vehicle passes through the street image capturing point based on a result of analyzing the moving path, set a guidance point by calculating and setting a real street image output point according to the result of analyzing the moving path and a result of determining whether or not the vehicle passes through the street image capturing point, confirm whether or not the vehicle enters the real street image output point calculated during setting the guidance point, and output the real street image on the screen upon confirming that the vehicle enters the real street image output point.

2. The apparatus of claim 1, wherein the output unit includes a display device configured to output image guidance information and a voice output device configured to output voice guidance information.

3. The apparatus of claim 1, wherein the storage unit includes an image information storage module configured to store image information for the real street image and a position information storage module configured to store the position information of the vehicle at the street image capturing point of time.

4. The apparatus of claim 1, wherein the camera and the receiving unit are configured to use a configuration of a smart phone of the user connected to the control unit through an agreed connector.

5. The apparatus of claim 1, wherein the camera and the receiving unit are configured of a combination of a black box for the vehicle and a navigation system.

6. The apparatus of claim 1, further comprising a map information storage unit is configured to store geographic information and road information around a road on which the vehicle is traveling as data,
    wherein the control unit controls the geographic information and road information around the road provided from the map information storage unit to be output through a guidance message output unit based on the street information stored in the street information storage unit.

7. The apparatus of claim 2, wherein the input unit includes a touch screen integrally embedded within the display device as a touch panel.

8. A method of displaying road guidance using a geo-tagging image in a traveling guidance system for a vehicle, the method comprising:
    storing a real street image having real street conditions by capturing the real street image at a specific point by a camera and storing the street image with position information at a corresponding point;
    analyzing a moving path in which the vehicle is to be traveling;
    determining whether or not the vehicle passes through a street image capturing point based on a result of analyzing the moving;
    setting a guidance point by calculating and setting a real street image output point according to the result of analyzing the moving path and determining whether or not the vehicle passes through the street image capturing point;
    confirming whether or not the vehicle enters a real street image output point calculated during setting the guidance point; and
    in response to confirming that the vehicle enters the real street image output point, outputting the stored real street image on a screen when a reproduction command is input by a user or when a vehicle is within a predetermined distance from a street image capturing point.

9. The method of claim 8, wherein storing includes capturing the real street image by rotating the camera by 360 degrees on the basis of a traveling direction of the vehicle and storing a forward street image, and
    wherein the method further comprises providing the real street image for the traveling direction of the vehicle even when the vehicle passes through the street image capturing point in any direction based on the analysis result in the analyzing process.

10. The method of claim 8, wherein setting includes setting a plurality of guidance points in a predetermined distance interval on the basis of the street image capturing point, and
    wherein outputting includes classifying a position of the vehicle for each area on the basis of each guidance point calculated in the guidance point setting process and displaying the real street image by changing a size and color of the real street image according to a position at which the vehicle arrives.

11. A non-transitory computer readable medium containing program instructions executed by a processor or controller, the computer readable medium comprising:
- program instructions that store a real street image having real street conditions by capturing the real street image at a specific point by a camera and storing in a storage unit the real street image along with position information at a corresponding point;
- program instructions that analyze a moving path in which the vehicle is to be traveling;
- program instructions that determine whether or not the vehicle passes through a street image capturing point based on a result of analyzing the moving;
- program instructions that set a guidance point by calculating and setting a real street image output point according to the result of analyzing the moving path and determining whether or not the vehicle passes through the street image capturing point;
- program instructions that confirm whether or not the vehicle enters a real street image output point calculated during setting the guidance point; and
- program instructions that in response to confirming that the vehicle enters the real street image output point, output the real street image, stored in the storage unit, on a screen when a reproduction command is input by a user or when a vehicle is within a distance from a street image capturing point.

* * * * *